Feb. 21, 1933. H. A. ROIHAN 1,898,896

VEHICLE WHEEL CHOCK OR BLOCK

Filed Dec. 28, 1931

Henry A. Roihan
INVENTOR

BY Victor J. Evans & Co.
ATTORNEY

Patented Feb. 21, 1933

1,898,896

UNITED STATES PATENT OFFICE

HENRY A. ROIHAN, OF GREENSBURG, PENNSYLVANIA

VEHICLE WHEEL CHOCK OR BLOCK

Application filed December 28, 1931. Serial No. 583,523.

The invention relates to a vehicle wheel chock or block and more particularly to a universally acting wheel chock or block.

The primary object of the invention is the provision of a chock or block of this character wherein the same constitutes a permanent equipment for a wheeled vehicle such as busses, trucks, airplanes, wagons and other types of propelled vehicles so that when such vehicle is at rest either upon a level or an incline forward or backward movement thereof will be prevented, thereby avoiding the use of the brake mechanism of the vehicle for this purpose.

Another object of the invention is the provision of a chock or block of this character wherein the same is operable from the driver's seat of the vehicle and a wheel thereof can be blocked so that there is no liability of motion of such vehicle particularly when on an incline and should an operator thereof neglect to apply the brakes in this instance, this chock or block being made as a part of the equipment of the vehicle especially when the brakes are faulty and will not function to hold the vehicle at a standstill when brought to rest.

A further object of the invention is the provision of a chock or block of this character wherein its construction permits of adjustment for the positioning either fore or aft of a wheel of a vehicle, whereby the latter will be locked to avoid the moving of the vehicle, this passive condition being necessary when making repairs to the vehicle or the tire of its wheels upon a road or too far distanced from a repair shop.

A still further object of the invention is the provision of a chock or block of this character which is extremely simple in its construction, readily and easily mountable upon a wheeled vehicle, operative with convenience and dispatch by a driver of the vehicle when seated therein, thoroughly reliable and efficient in its purpose, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the appended claims.

In the accompanying drawing:—

Similar reference characters indicate corresponding parts throughout the several views in the drawing.

Figure 1:
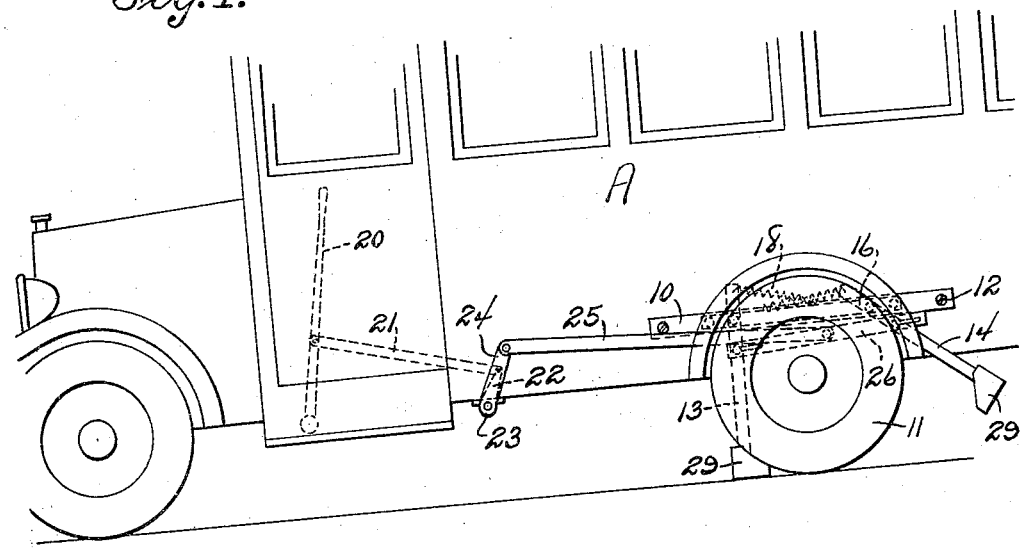
Figure 1 is a fragmentary side elevation of a wheeled vehicle showing the chock or block constructed in accordance with the invention applied and positioned for retarding the advance of the vehicle upon an incline.
Figure 2:
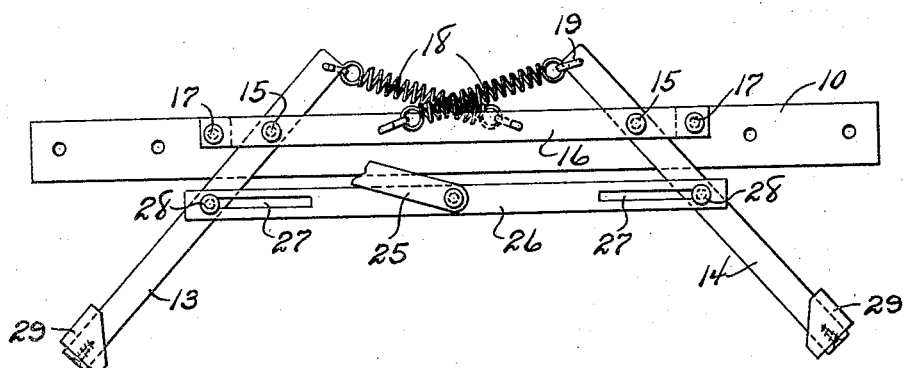
Figure 2 is an enlarged side elevation of the chock or block removed from the vehicle.
Figure 3:
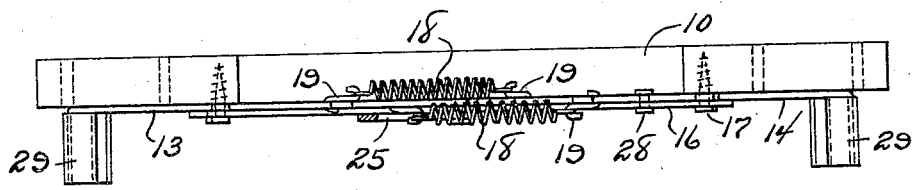
Figure 3 is a top plan view thereof.

Referring to the drawing in detail, A designates generally a portion of a wheeled vehicle, the same in this instance being of the bus type and constituting a part of its equipment is the chock or block constituting the present invention and hereinafter fully described.

The chock or block comprises a bar or beam 10 which is adapted for mounting upon the body of the vehicle A adjacent to one of its rear wheels 11, the bar or beam 10 being made fast in any suitable manner preferably through the use of fasteners 12 and has swingingly supported thereon opposed spaced arms 13 and 14 respectively, these being alike and are carried upon pivots 15 engaged in an outside strip or iron 16 fastened to the bar or beam 10 at its ends through the medium of the members 17, the pivot 15 being also passed through the arms 13 and 14 and engaged in the bar or beam 10 so that the arms can be arcuately swung.

Connected with the upper ends of the arms 13 and 14 and also with the strip or iron 16 are coiled retractile springs 18, these being disposed in crossed relation to each other and are detachably connected as stated by double hooks 19, the springs 18 being designed to tension the said arms 13 and 14 so as to normally spread the lowermost ends thereof apart. The arm 13 is located fore of the rear wheel 11 while the arm 14 is disposed aft thereof and such arms by the action of the springs 18 will have their lower ends normally elevated from a foundation or ground surface with which the rear wheel 11 is contacting.

Located within the body of the vehicle A convenient for reach by an operator when seated therein is a throw lever 20 which through the link 21 pivoted thereto and through a crank 22 of a rocking shaft 23 will operate the arms 13 and 14, the shaft 23 being also provided with a crank 24 to which is pivoted a link 25, the latter being pivoted to an actuator bar 26 for the arms 13 and 14. This actuator bar at opposite end portions has formed therein slots 27 for slidably receiving coupling pins 28 mounted in the arms 13 and 14 intermediate their ends, the pins 28 of these arms being normally at the outer ends of the slots 27 so that when the lever 20 is shifted in one direction, for example, rearwardly, the fore arm 13 will be swung arcuately under the tension of its spring 18 for the purposes of chocking or blocking the wheel 11.

The arms 13 and 14 carry chocks or blocks 29 which in their formation are of wedge contour to be brought into contacting engagement with a foundation or ground surface and the tread surface of the wheels 11 when swung to working position so as to effect the chocking or retarding of the wheel 11 from motion and in this fashion the vehicle will be sustained at rest, particularly when at an incline.

It will be apparent that in the operation of the chock or block the wheel 11 operated upon thereby can be chocked or blocked from movement in reverse direction, that is, either forwardly or rearwardly and thus sustain the vehicle at a standstill or at rest.

When the lever 20 is brought to a neutral position the arms 13 and 14 will have become raised under the action of the springs 18 so as to be out of the path of movement of the wheel 11 and inactive thereon.

What is claimed is:—

A vehicle wheel chock comprising a support adapted for mounting upon a body of a vehicle, a pair of arms pivotally connected with said support and located fore and aft of a vehicle wheel, wedge blocks carried by said arms for engagement with a foundation and the tread of the wheel, a lever within the body, connections between the lever and said arms to alternately move the same for engagement of the wedge blocks between the foundation and the tread of the wheel, and springs connected with the support and said arms to normally hold the same in position for elevation of the wedge blocks thereof.

In testimony whereof I affix my signature.

HENRY A. ROIHAN.